United States Patent
Judge et al.

(10) Patent No.: US 7,106,217 B2
(45) Date of Patent: Sep. 12, 2006

(54) TECHNICAL DESIGN CONCEPTS TO IMPROVE HELICOPTER OBSTACLE AVOIDANCE AND OPERATIONS IN "BROWNOUT" CONDITIONS

(75) Inventors: John H. Judge, Woodbury, CT (US); John J. Occhiato, Derby, CT (US); Lorren Stiles, Palm City, FL (US); Vineet Sahasrabudhe, Hamden, CT (US); Margaret A. MacIsaac, Woodbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/816,218

(22) Filed: Mar. 31, 2004

(65) Prior Publication Data

US 2004/0217883 A1    Nov. 4, 2004

Related U.S. Application Data

(60) Provisional application No. 60/458,257, filed on Mar. 31, 2003.

(51) Int. Cl.
    *G01C 23/00* (2006.01)
(52) U.S. Cl. .......................... 340/973; 340/970; 701/14
(58) Field of Classification Search ................ 340/961, 340/946, 963, 970–975, 980, 977; 701/3, 701/4, 9, 14, 16, 120, 301
See application file for complete search history.

(56) References Cited

U.S. PATENT DOCUMENTS

| 5,296,854 | A * | 3/1994 | Hamilton et al. | ........... 340/980 |
| 5,448,233 | A * | 9/1995 | Saban et al. | ................ 340/963 |
| 5,859,597 | A * | 1/1999 | Cornelio et al. | ............ 340/946 |
| 6,057,786 | A * | 5/2000 | Briffe et al. | ................ 340/975 |
| 6,072,420 | A * | 6/2000 | Hellsten | ................... 342/25 R |
| 6,208,270 | B1 * | 3/2001 | Dunn | ......................... 340/961 |
| 6,216,065 | B1 * | 4/2001 | Hall et al. | .................... 701/16 |
| 6,255,965 | B1 * | 7/2001 | D'Orso | ....................... 340/946 |
| 6,452,511 | B1 * | 9/2002 | Kelly et al. | ................. 340/970 |
| 6,653,947 | B1 * | 11/2003 | Dwyer et al. | .............. 340/970 |
| 6,798,423 | B1 * | 9/2004 | Wilkins et al. | ............. 345/618 |
| 2003/0014165 | A1 * | 1/2003 | Baker et al. | ................... 701/3 |

* cited by examiner

*Primary Examiner*—Brent A. Swarthout
(74) *Attorney, Agent, or Firm*—Carlson, Gaskey & Olds

(57) ABSTRACT

A method for flying in a degraded visual environment comprising the steps of collecting environmental data, processing the data and fusing the data together into a combined input output. The output is fed into a head down display, head mounted or heads up display and, preferably to a fly-by-wire vertical take-off and landing capable vehicle wherein the fly-by-wire system makes automatic adjustments to the helicopter.

33 Claims, 4 Drawing Sheets

Alt=93 ft @ 600 fpm V=18 Knots

AIRCRAFT ACCELERATING FORWARD/LONGITUDINALLY

Alt=93 ft @ 600 fpm V=30 Knots

AIRCRAFT ACCELERATING FORWARD AND TO THE RIGHT

Alt=93 ft @ 600 fpm V=10 Knots

AIRCRAFT DECELERATING AND MOVING REARWARD. AIRCRAFT IS SLOWING DOWN INDICATED BY VECTOR RETRACTING/ GETTING SMALLER AND CIRCLE IS MOVING TOWARDS CENTER - AIRCRAFT IS SLOWING DOWN TO A HOVER

APPROACH TO HOVER, AIRCRAFT MOVING FORWARD LONGITUDINALLY BUT SLOWING DOWN INDICATED BY ACCEL BALL RETRACTING DOWN VELOCITY VECTOR

AIRCRAFT COMING TO A HOVER AT 50 FEET OVER GROUND. DECENT RATE SLOWED DOWN INDICATED BY REDUCTION IN ALT TREND BAR. INDICATED BY SMALL VECTOR, AND ACCEL BALL APPROACHING HOVER POINT.

HOVER

TECHNICAL DESIGN CONCEPTS TO IMPROVE HELICOPTER OBSTACLE AVOIDANCE AND OPERATIONS IN "BROWNOUT" CONDITIONS

This invention claims priority to U.S. Provisional Patent Application 60/458,257 dated Mar. 31, 2003.

BACKGROUND OF THE INVENTION

1. Field of the Invention

This invention relates generally to flight control systems and display systems for vertical take off and landing capable aircraft.

2. Description of the Prior Art

Hazardous weather conditions significantly limit the operational capability of helicopters. Helicopters are called upon routinely to approach and land at remote sites without the aid of navigation guidance or acceptable and safe visual conditions. Often the topography, ground hazards, obstacles and weather in the area are unknown or changing. Upon arrival at a remote location, the pilot must make critical judgments based on incomplete or inaccurate data available to him in order to determine the proper procedure to approach and land at the site. If the surface condition is such that dust, snow, sand, etc. will be blown up by rotor downwash, the helicopter is often suddenly engulfed in a cloud of visually-restrictive material, causing the pilot to lose his visual references. The loss of visual references causes spatial disorientation problems that impede a pilot from making a fully stabilized safe landing.

The pilot uses his visual references for determining his control strategy to stabilize and bring the aircraft to a prelanding quiescent trim condition and to establish his ground closure rates as he finalizes his approach and touches down. In interviews with pilots, it was determined that pilot workload and procedures such as cross cockpit checks increase during a tactical "brownout" landing. When references are lost, a pilot may know his attitude references, but he is most likely unaware of his fore and aft, lateral, and vertical speed relative to the ground. He may also not be aware of the local terrain contour for a safe all wheel settling to the ground.

This has prevented many helicopter pilots from completing missions, or even losing control of the helicopter causing injury, and, in some cases, death and loss of the helicopter.

This limitation partially arises from the crew's inability to determine the location of obstacles in the environment by sight. In order to assist the crew in these circumstances, a range of equipment and sensors may be installed in the helicopter to provide information about the helicopter's position and the position of obstacles. The information provided by the sensors is inherently inaccurate at least because of the time delay in the system but also because of the uncertainty associated with sensor. As the dynamics of the obstacles cannot be guaranteed to be linear, these process models must be capable of reflecting this non-linear behavior. The uncertain information produced by various sensors is related to required knowledge about the obstacles by a sensor model however this relationship need not be linear, and may even have to be learned.

In order to limit the inaccuracies, current helicopter flight control systems use estimation techniques to counteract the error in the sensors. One of the best currently used techniques, an ordinary extended Kalman filter, is inadequate for estimating the uncertainty involved in the obstacles' positions for the highly non-linear processes under consideration. Neural network approaches to non-linear estimation have recently allowed process and sensor models to be learned; however, these approaches are also inadequate.

A shortcoming of the prior art is that with multiple sensors on board, there is a problem of efficiently assimilating the large amount of imagery and data available.

Additionally, another shortcoming of the prior art is the high demand that the scanning of multiple flight instruments places on a pilot. When in a brownout situation, the pilot must focus himself on multiple flight display instruments in order to compensate for his lack of visual landing references.

Yet another shortcoming of the prior art is the mechanical control of the helicopter. Currently, in contrast to modern airplanes, helicopters are either normally mechanically or hydro-mechanically controlled. The partial authority of the flight control system on such helicopters limits the ability of the flight control stability augmentation system to aid the pilot in high workload situations.

Prior to this invention, pilots heavily relied on repetitive training to help them with lost visibility outside the cockpit, for example "brownout". In addition to training, helicopter and avionic manufacturers have tried to help pilots effectively deal with brownout. They have proposed several partial solutions, but they have been incomplete or ineffective in dealing with the brownout problem. Some of these attempts include hover displays with velocity and acceleration cues, coupled hover landings using radar altimeter and Doppler coupled autopilots, and FLIR turret vertical look-down imaging and improved stability augmentation. Full implementation of these individual ideas have not resulted in a full-proof solution to allow a pilot to fly in a degraded visual environment (DVE). None of the proposed prior art solutions have fully addressed the spatial disorientation problem much less allowed a pilot to make a fully stabilized safe landing.

SUMMARY OF THE INVENTION

The present invention recognizes and addresses the foregoing disadvantages, and other prior art methods.

Accordingly, it is an object of the invention to solve acute DVE problem plaguing helicopter operations, most recently in Iraq and Afghanistan. The US Army, USAF and USMC have experienced accidents attributed to dust blown (or snow-blown) conditions which blind pilots entering a hover.

Another object of the invention is to provide a DVE solution useable with night vision goggles.

Still another object of the invention is to provide a DVE solution based on a spectrum of sensor inputs.

Yet another object of the invention is to provide a DVE system that contains a processor that is functional with any combination of sensors typically found on a helicopter to reduce the customization of the system.

Yet another object of the invention is to reduce the data workload through automatic assimilation (sensor fusion) of data.

Another object of the invention is to provide a system for guiding a pilot along an obstacle free path.

Still another object of the invention is to provide a system that more accurately predicts positions of objects and an aircraft relation thereto.

These and other objects of the present invention are achieved by providing a DVE solution with augmented visual cues and advanced Fly by Wire (FBW) flight control systems. The system for guiding pilots in DVE situations includes an array of sensors providing inputs to a central processing unit, the CPU, which processes the data from at least two sensors, provides an output to a hover display, and the hover display which guides the pilot to a safe landing.

Other objects, features and aspects of the present invention are discussed in greater detail below.

Additional objects and advantages of the invention are set forth in the detailed description herein, or will be apparent to those of ordinary skill in the art.

DETAILED DESCRIPTION OF THE PREFERRED EMBODIMENTS

Figure 1:
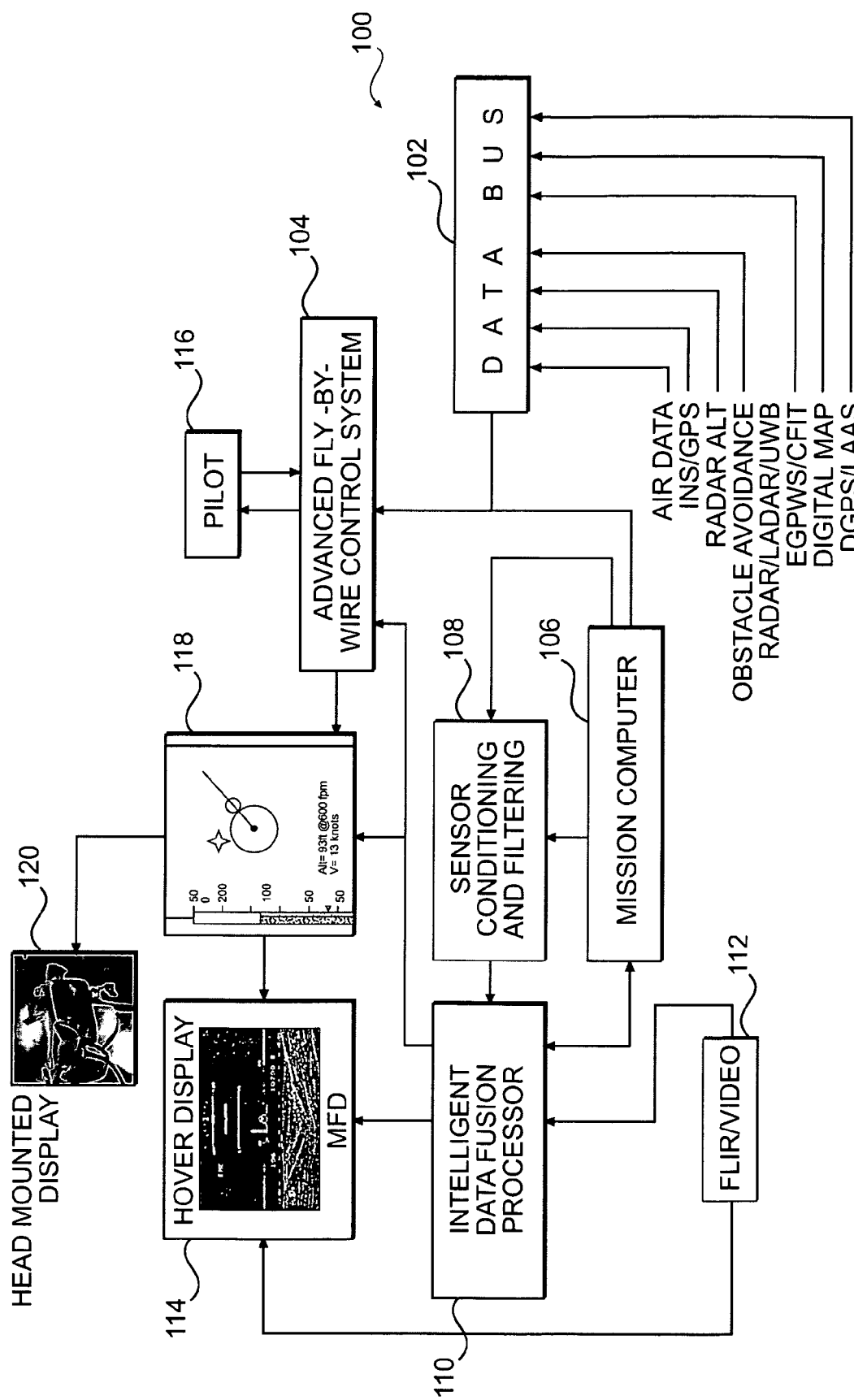
FIG. 1 is system architecture block diagram of an embodiment of the invention.

It is to be understood by one of ordinary skill in the art that the present discussion is a description of exemplary embodiments only and is not intended as limiting the broader aspects of the present invention. The broader aspects are embodied in the exemplary construction.

Preferably, the system for flight in DVE comprises a plurality of suites that when interconnected functions to assist a pilot 116 operate a vertical take off and landing (VTOL) aircraft. Typically, the suites incorporated in the DVE system are suites for (FBW) flight control, display, sensors, navigation data fusion and display processing, and control.

The flight control suite provides a stabilized flight control system. The flight control includes control logic to enable a pilot to command a stabilized flight path, hold hover position and altitude, and execute a vertical landing in zero or near zero visibility. Additionally, variable limits are implemented in the FBW flight control system in response to the height of the aircraft above ground and its rate of descent.

The display suite can be implemented in a number of ways, however, there are two preferred displays. The first is a head-mounted display with sufficient field of view that provides visually coupled information to the pilot to augment the natural out-the-window view. The information presented on the helmet is stabilized in conformity to overlay the outside scene through the utilization of a head-tracking device. Preferably, the device also permits the pilot to cue the on board systems to points of interest the pilot is viewing in the outside scene. The helmet display may be augmented by other panel-mounted displays to enable transfer of information to the system. The second preferred embodiment is a head up display (HUD) with generally the same information.

A sensor suite is used to survey the outside scene and to provide environmental information and other information to the pilot to augment visual cues. This environmental information is presented in the form of synthetic imagery which overlays the outside scene, and/or symbology which cues the pilot as to the proper actions to employ to complete a task. The sensors may comprise a radar altimeter, air data system, inertial navigation systems, traffic alert and collision avoidance system, terrain database, global positioning system, microwave radar, 35 GHz wave scanning beam radar. Imagery information that is typically collected by an imaging system such as a forward looking infrared (FLIR) camera, and video camera.

A navigation suite communicates with the sensor suite to provide precise navigation information, including groundspeed, ground track, wind direction and speed, location of the landing zone, location of other aircraft in the formation, aircraft performance (power required to hover, power available, etc), vertical velocity, height above ground, etc. The navigation information provided to the pilot is information that cannot normally be gathered by purely visual attentiveness during the approach and landing, especially in DVE conditions.

A data fusion suite and display processor suite incorporates unique logic and algorithms which fuses together the wide variety of information available from the sensor suites and imaging systems, and displays symbology which facilitates an approach/landing. The display processor suite filters environmental information, imagery information, and navigation information, and converts it into a format for pilot display. This suite fuses sensor information, imagery information, and, if appropriate, creates synthetic imagery and symbology that directs the pilot to conduct tasks in such a way as to complete the approach/landing.

A control suite includes input/output controls that are employed to enable a pilot to request information from the system, or convey intent, so the processor suite may determine what information is to be presented, at what time, and in what format for the task at hand.

Referring now to FIG. 1, a system architecture diagram of an embodiment of the system 100 to fly in DVE is schematically illustrated in block format. The system 100 includes a data bus 102 with inputs from a variety of sensors, a mission computer or CPU 106, intelligent data fusion processor 110, sensor conditioning and filtering 108, fly by wire (FBW) flight control system 104, and a Forward Looking Infrared System (FLIR) 112.

The pilotage of the VTOL aircraft is through the FBW system 104. The FBW system 104 preferably has certain inputs in order facilitate pilot control of the aircraft. The first main input is from the data bus 102. The data from the data bus 102 may include air data, GPS information, a radar altimeter, obstacle avoidance equipment, Enhanced Ground Proximity Warning System (EGPWS)/Controlled Flight Into Terrain (CFIT), digital map, and Differential Global Positioning System (DGPS) among others. The data bus 102 data is fed to a mission computer 106, which outputs signals to the FBW system 104 to manipulate the aircraft in close proximity to terrain, and to a sensor conditioning and filtering system 108 that filters the data to extract particular data signals. The mission computer 106 and the sensor conditioning and filter system 108 provide data to a data fusion processor 110, which analyzes the data and compiles the various data into a combined output. For example, when there is both FLIR and visual imagery data, the data fusion processor 110 combines the imagery information from the FLIR system and visual information from a camera system as well as symbology generated from the environmental information collected by the sensor suite into a single picture displayed in a hover display 114. The hover display 114 may be displayed in a head mounted display (HMD) 120 or on a head's up display.

Additionally, the data fusion processor 110 provides information to the FBW system 104. The combined environmental information and mission-specific information may be used to automatically manipulate an aircraft such that obstacles are automatically avoided. By direct communication with the FBW system 104. The data fusion processor 110 and the FBW system 104 both provide data so that a display 118 as shown in more detail in FIG. 2 may be generated. The display 118 may also be provided for display in the HMD 120.

While it is typical for attack helicopters to utilize a HMD that incorporated contact analog flight symbology to maintain continuous heads up, eyes out posture, most aircraft continue to use head down displays and/or non-head tracked symbology (HUDs). Therefore, a head down approach to hover and hover display may additionally or alternatively be provided as illustrated.

The intent of the display 118 is to provide the pilot with precise pilotage cueing in the approach to hover, with reference to aircraft velocity, location relative to the planned landing area, altitude and rate of descent. Most importantly, trend information is provided to assist the pilot in seeing a future state of the aircraft. Overlaid on the trend information is command cueing to indicate what the optimal trend is at the current point in the descent profile. Additionally, the display provides a pilot with visual indicator symbology such that the pilot is aware of unsafe landing areas.

The symbology provided by display 118 shown in FIG. 2 below provides this precise pilotage cueing for approach to hover, with reference to aircraft velocity, location relative to the planned landing point, altitude and rate of ascent/descent information in a single, integrated data set to reduce pilot workload through automatic assimilation (sensor fusion) of data. That is, the information from the multiple of sensors and FBW system are combined through data fusion and displayed on display 118 in a format which readily improves pilot cuing to a desired landing point through intuitive symbology.

The display 118 preferably combines distance (relative position between current aircraft position and desired landing point) aircraft velocity (velocity vector) and aircraft acceleration (acceleration ball movement relative velocity vector) information all on one display in a symbology format which radically improves approach to hover. Notably, the acceleration ball is also preferably color coded to provide further indication of acceleration, such as green for below or on acceleration limits, yellow for close to acceleration limits or red for above acceleration limits.

Figure 2:
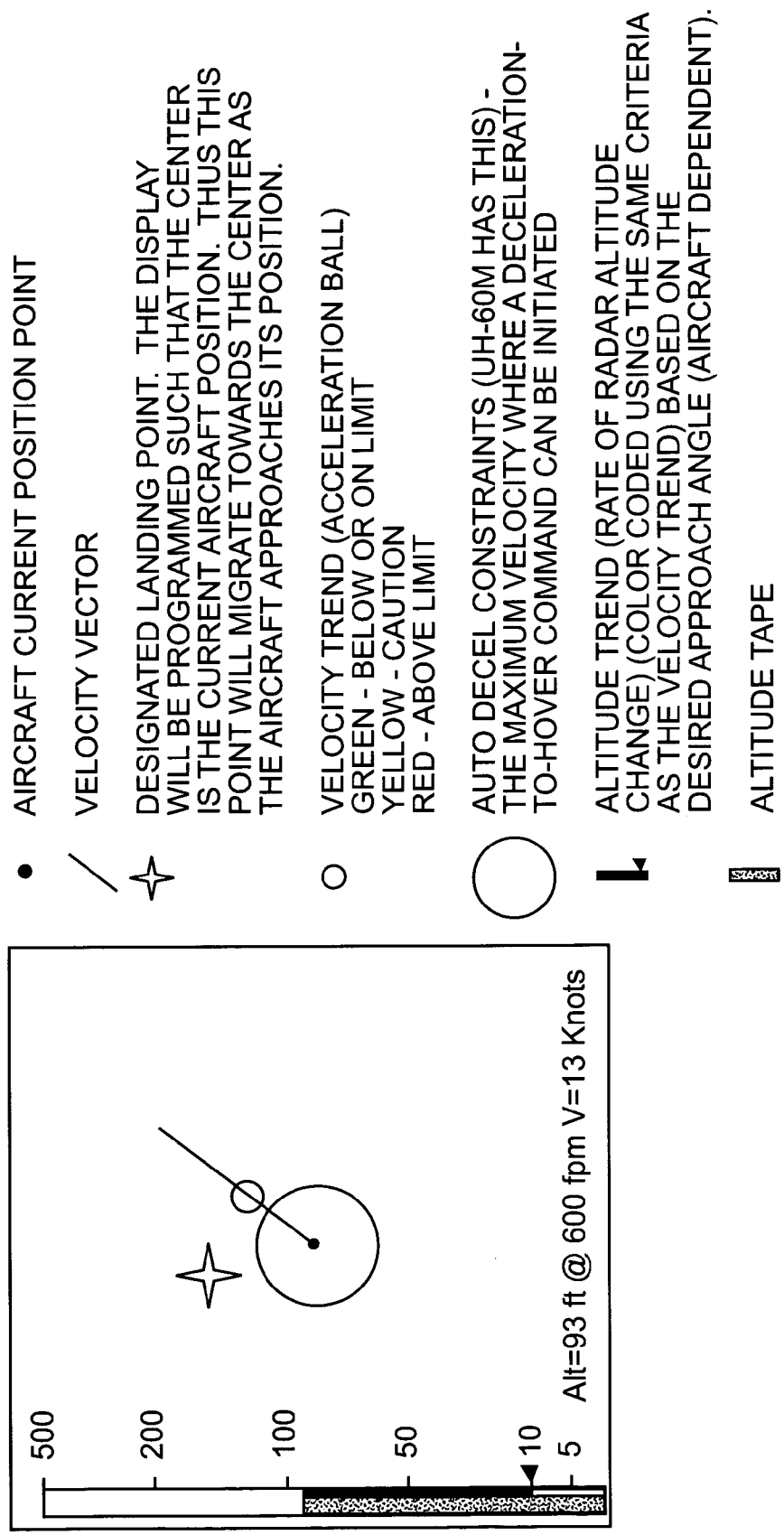
FIG. 2 is one embodiment of a hover display.

In FIG. 2, the symbology illustrated on the display 118, exemplary illustrates that the aircraft is close to the desired landing point, however it is translating to the right, away from the desired point. The deceleration rate is within tolerance for the current altitude such that the acceleration ball would be green. The velocity trend is displayed by the acceleration ball which moves relative to an end of the velocity vector opposite the aircraft current position point. Here, the acceleration ball is indicating that the aircraft is decelerating as the acceleration ball is on the velocity vector closer to the aircraft current position point. When the velocity vector and acceleration ball are contained within the auto deceleration constraint circle, automatic hover control is preferably initiated by the FBW system.

Figure 2A:
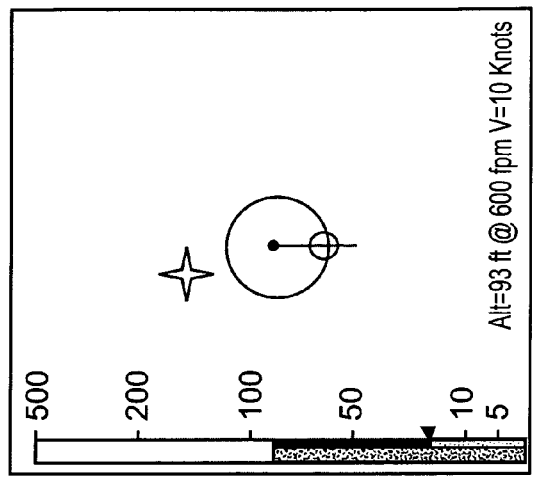
FIG. 2A is the hover display of FIG. 2 displaying symbology illustrating the aircraft translating longitudinally forward at a constant acceleration.

The velocity vector, which extends from the current aircraft position point, extends and retracts in proportion to aircraft ground speed. The direction of the vector on the display 118 is equal to the angle between the ground track of the aircraft center of mass and the aircraft centerline. The acceleration ball (small circle in line with the velocity vector) is referenced to the end of the velocity vector and displays the instantaneous acceleration rate of the aircraft, i.e., the first derivative of the velocity vector. With zero acceleration, the acceleration ball remains at rest over the end of the velocity vector (FIG. 2A). As the aircraft accelerates, the acceleration ball will displace relative to an end of the velocity vector a distance in proportional to the acceleration. The velocity vector will then extend to meet the acceleration ball as the aircraft velocity increases. The value of acceleration used to calculate the position of the acceleration ball is preferably predictive acceleration which factors in instantaneous acceleration, pilot stick position, and flight control dynamics.

Figure 2B:
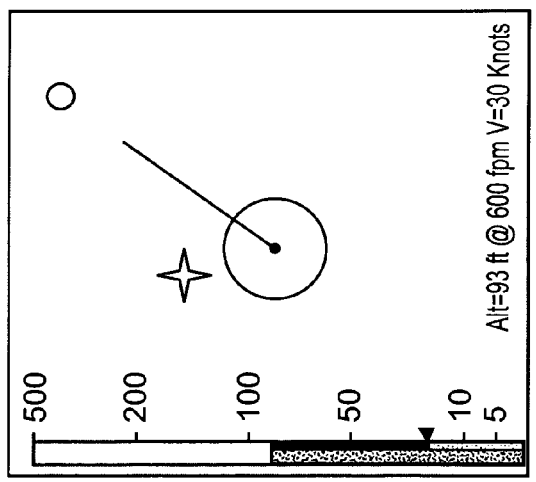
FIG. 2B is the hover display of FIG. 2 displaying symbology illustrating the aircraft center of mass is transiting rightward relative to the aircraft longitudinal axis.
Figure 2C:
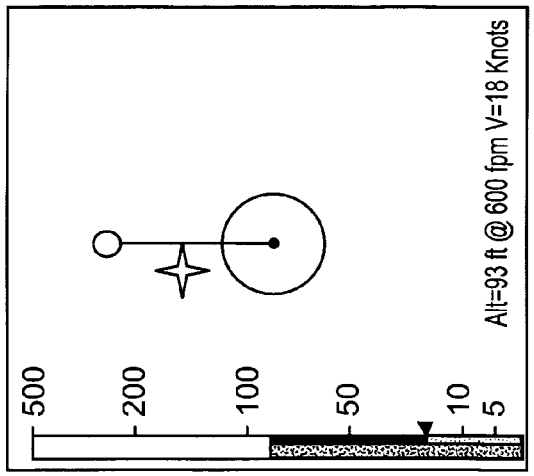
FIG. 2C is the hover display of FIG. 2 displaying symbology illustrating the aircraft translating longitudinally rearward and decelerating.

For example, if the aircraft is flying straight ahead with no disparity between ground track and aircraft centerline, the velocity vector extends forward/longitudinally up from the current aircraft position point (FIG. 2A). However, if the aircraft ground track is, for example, accelerating forward and tracking right relative the aircraft centerline due to cross-wind or other disturbance, the velocity vector will be angled to the right (FIG. 2B). If, for example, the aircraft is moving rearward and decelerating, the acceleration ball is moving toward the current aircraft center point along the velocity vector which is also retracting in length to indicate decreasing velocity (FIG. 2C).

A rate of ascent/descent altitude trend tape indicates a change in altitude trend which predicts the altitude to be approximately 20 ft Above Ground Level (AGL) several seconds in the future. The altitude trend tape is located adjacent to the current aircraft altitude tape and includes an altitude tick fixed to the end thereof. The tic serves as a visual "pointer" to increase visibility and attract pilot attention. The altitude trend tape indicates an altitude ascent/descent trend, i.e., the first derivative of altitude data to predict a trend in the aircraft's altitude. The altitude trend tape indicates the resultant altitude of the aircraft several seconds in the future. Notably, the altitude trend tape, like the acceleration ball is also preferably color coded to provide further indication of ascent and particularly descent, such as green for below a predetermined descent limit relative to altitude, yellow for being close to the predetermined descent limits and red for being above predetermined descent limits relative to altitude.

In FIG. 2, for example only, the altitude trend tape indicates a decreasing altitude trend indicating that the aircraft will be approximately 10 feet AGL several seconds in the future. A text field at the bottom of the display provides quantitative readout of critical information (current altitude, rate of descent, ground velocity) to increase situation awareness.

Figure 3A:
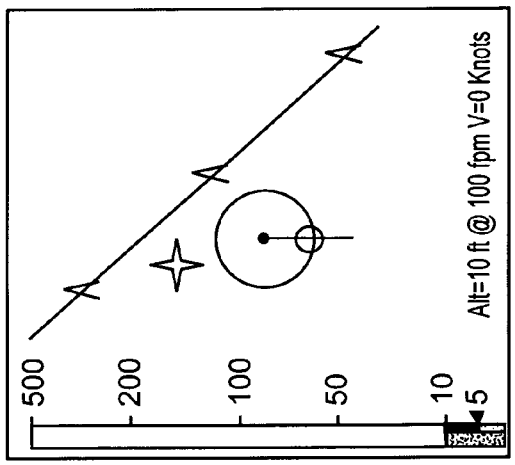
FIG. 3A is the hover display of FIG. 2 displaying symbology illustrating the aircraft approaching a desired landing point.
Figure 3A:
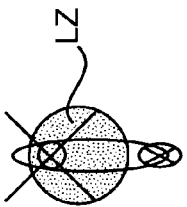
Figure 3B:
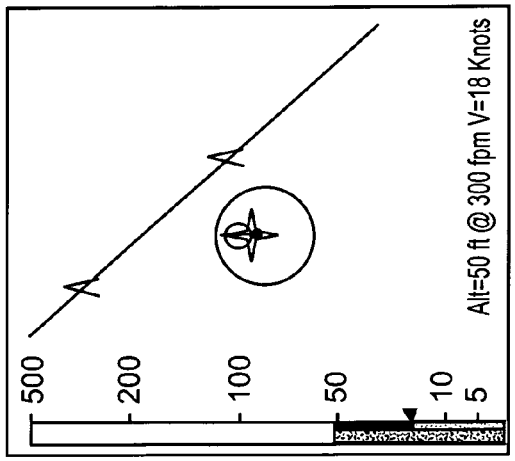
FIG. 3B is the hover display of FIG. 2 displaying symbology illustrating the aircraft closing over the desired landing point.
Figure 3B:
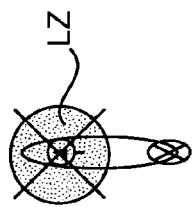
Figure 3C:
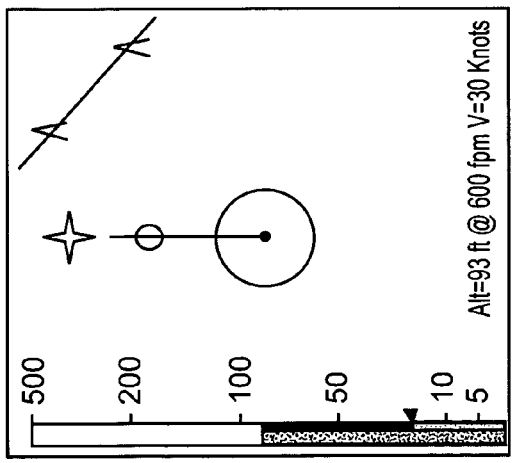
FIG. 3C is the hover display of FIG. 2 displaying symbology illustrating the aircraft hovering over the desired landing point at 10 feet AGL and beginning a descent.
Figure 3C:
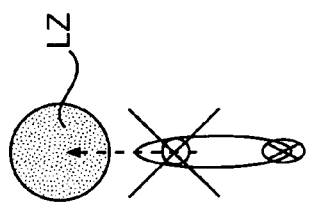

Referring To FIGS. 3A–3C, the aircraft is moving forward longitudinally (at 30 knts) but slowing as indicated by the acceleration ball retracting down the velocity vector (FIG. 3A). Altitude is also decreasing as indicated by the altitude trend tape. Notably, the display 114 generates symbology to indicate a terrain obstacle such as the displayed power lines. The obstacle location may have been determined by the sensor suite, FLIR system, terrain database, or other source.

The data fusion processor 110 positions the obstacle in spatial relationship relative to the current aircraft position such that the pilot can manipulate the aircraft to avoid the obstacle. Preferably, the FBW system will automatically adjust the aircraft flight path and override the pilot flight commands should the aircraft flight path be directed toward the obstacle.

In FIG. 3B, the aircraft it coming to a hover at 50 ft. AGL over the landing point. The aircraft is still has a slight forward velocity (18 knts) but the aircraft is still decelerating as indicated by the acceleration ball which is retracted from the end of the velocity vector. Note that the velocity vector is shorter in FIG. 3B relative to FIG. 3A. Notably, as the acceleration ball and the velocity vector are within the auto decel circle, auto hover mode in the FBW system is available and the pilot need only make final adjustments. The aircraft is also still descending but at a lesser rate.

In FIG. 3C, the aircraft is in a hover at 10 ft AGL over the landing point. Notably, the velocity vector has retracted into the aircraft current position point and the acceleration ball surrounds the aircraft current position point indicating zero forward velocity and acceleration, i.e., steady hover. The aircraft is descending from ten feet but at a slower rate than FIG. 3B as indicated by the shortened altitude trend tape.

Advantageously, the system of the present invention uses a unique combination of sensor, navigational and display data enhancing the situational awareness of pilots operating VTOL aircraft while minimizing impact to the pilot's workload.

It should be appreciated that modifications and variations to the specifically illustrated and discussed structure may be practiced in various embodiments and uses of this invention without departing from the spirit and scope thereof. Such variations may include but are not limited to, substitution of equivalent structure for those shown or discussed and the repositioning of various elements, or the like.

What is claimed is:

1. A system to enhance situational awareness in a vertical take-off and landing (VTOL) aircraft in close proximity to the ground in a degraded visual environment (DVE), comprising:
   a sensor suite that receives environmental information;
   an imaging system that receives imagery;
   a data fusion processor in communication with said sensor suite and said imaging system; which compiles said environmental information and said imagery information into a combined output; and
   a display in communication with said data fusion processor, said display generating symbology in response to said combined output, said symbology relates an aircraft velocity vector relative an aircraft current position point and an acceleration ball relative said velocity vector.

2. The system as recited in claim 1, wherein said display includes a heads up display.

3. The system as recited in claim 1, wherein said display includes a head down multifunctional display.

4. The system as recited in claim 1, wherein said display includes a helmet-mounted display.

5. The system as recited in claim 1, wherein said imaging system includes a forward looking infrared (FLIR) system, said data fusion processor overlaying FLIR imagery on said display.

6. The system as recited in claim 1, wherein said imaging system includes a video system, said data fusion processor overlaying said video imagery on said display.

7. The system as recited in claim 1, wherein said data fusion processor combines said environmental information and said imagery information with an obstacle avoidance system.

8. The system as recited in claim 7, further comprising a fly by wire (FBW) system in communication with said data fusion processor, said FBW system operable to provide automated obstacle avoidance in response to said obstacle avoidance system.

9. The system as recited in claim 7, further comprising a fly by wire (FBW) system in communication with said data fusion processor, said FBW system operable to command a stabilized flight condition in response to said combined output.

10. A system to enhance situational awareness in a vertical take-off and landing (VTOL) aircraft in close proximity to the ground in a degraded visual environment (DVE), comprising:
    a sensor suite that receives environmental information;
    an imaging system that receives imagery information;
    a data fusion processor in communication with said sensor suite and said imaging system; which compiles said environmental information and said imagery information into a combined output; and
    a display in communication with said data fusion processor, said display generating symbology in response to said combined output which displays an aircraft current position relative to a designated landing point, said symbology relates an aircraft velocity vector relative an aircraft current position point and an acceleration ball relative said velocity vector.

11. The system as recited in claim 10, wherein said acceleration ball is indexed relative an end of said velocity vector opposite said aircraft current position point.

12. A method to facilitate flying a vertical take-off and landing (VTOL) aircraft in close proximity to the ground in a degraded visual environment (DVE) comprising the steps of:
    (1) fusing environmental information from a sensor suite with imagery information from an imaging system into a combined output;
    (2) communicating the combined output to a fly by wire (FBW) control systems to maneuver the VTOL aircraft in close proximity to the ground;
    (3) generating symbology in response to said combined output which relates an aircraft current position relative to a designated landing point to facilitate a landing at the designated landing point, said symbology relates an aircraft velocity vector relative an aircraft current position point and an acceleration ball relative said velocity vector; and
    (4) displaying the symbology.

13. A method as recited in claim 12, wherein said step (3) further comprises (using FLIR imagery data from an imaging system with the symbology.

14. A method as recited in claim 12, wherein said step (3) further comprises fusing terrain avoidance data with the symbology.

15. A method as recited in claim 14, wherein said step (2) further comprises communicating a flight command to the FBW control system in response to the combined output to avoid a terrain obstacle.

16. A method to facilitate flying a vertical take-off and landing (VTOL) aircraft in close proximity to the ground in a degraded visual environment (DVE) comprising the steps of:

(1) fusing environmental information from a sensor suite with imagery information from an imaging system into a combined output;
(2) communicating the combined output to a fly by wire (FBW) control systems to maneuver the VTOL aircraft in close proximity to the ground;
(3) generating symbology in response to said combined output which relates an aircraft current position relative to a designated landing point by displaying a distance and direction between an aircraft current position relative to the designated landing point; and
(4) displaying the symbology.

17. A method as recited in claim 16, wherein said step (3) further comprises displaying an aircraft velocity vector relative the aircraft current position point and an acceleration ball relative said velocity vector, the acceleration ball movable relative an end of the velocity vector opposite the aircraft current position point to display a velocity trend.

18. A method as recited in claim 17, wherein said step (3) further comprises:
(a) displaying an above ground level (AGL) altitude tape and an altitude ascent/descent trend tape adjacent the AGL altitude tape; and
(b) coloring the altitude ascent/descent trend tape in response to a relationship between an aircraft altitude and a descent trend.

19. A method as recited in claim 18, wherein said step (3) further comprises:
(a) displaying an auto decel constraint circle representing an automated hover hold system in the FBW system; and
(b) communicating with the FBW control system to activate an automated hover hold system in response to the velocity vector and the acceleration ball being contained within the auto decel constraint circle.

20. A system to enhance situational awareness in a vertical take-off and landing (VTOL) aircraft in close proximity to the ground in a degraded visual environment (DVE), comprising:
a sensor suite that receives environmental information;
an imaging system that receives imagery information;
a data fusion processor in communication with said sensor suite and said imaging system; to compile said environmental information and said imagery information into a combined output; and a display in communication with said data fusion processor, said display generating symbology in response to said combined output to display an aircraft current position relative to a designated landing point, said display generates symbology in response to said combined output which relates aircraft state information relative to the designated landing point to cue the pilot to control the aircraft to touchdown at the designated landing point, said aircraft state information includes a velocity vector and an acceleration ball.

21. The system as recited in claim 20, wherein said acceleration ball is indexed relative an end of said velocity vector opposite an aircraft current position point which defines the aircraft position relative the designated landing point.

22. The system as recited in claim 20, wherein said designated landing point is an input to said data fusion processor.

23. The system as recited in claim 1, wherein said display generating symbology in response to said combined output displays an aircraft current position relative to a designated landing point to facilitate a landing at the designated landing point.

24. The system as recited in claim 1, wherein said acceleration ball is color coded to indicate when an acceleration is within a predefined limit.

25. The system as recited in claim 1, wherein said acceleration ball is indexed relative an end of said velocity vector opposite said aircraft current position point.

26. The system as recited in claim 25, further comprising an auto deceleration constraint circle defined about said aircraft current position point, automatic hover control initiated by a FBW system in response to said velocity vector and said acceleration ball being contained within the auto deceleration constraint circle.

27. The system as recited in claim 1, wherein said velocity vector extends and retracts in length relative said aircraft current position point in proportion to an aircraft ground speed.

28. The system as recited in claim 1, wherein an azimuth direction of said velocity vector is approximately equal to an angle between a ground track of an aircraft center of mass and an aircraft centerline.

29. The system as recited in claim 1, wherein said acceleration ball is referenced to an end of said velocity vector such that at zero aircraft acceleration said acceleration ball remains at rest over said end of said velocity vector, said acceleration ball movable with respect to said end of said velocity vector a distance in proportional to the acceleration, said acceleration ball movable away from said aircraft current position point in response to aircraft acceleration and said acceleration ball movable toward said aircraft current position point in response to aircraft deceleration.

30. The system as recited in claim 1, further comprising an ascent/descent altitude trend tape which predicts an aircraft altitude above ground level at a predetermined time period.

31. The system as recited in claim 30, wherein said ascent/descent altitude tend tape is color coded.

32. The system as recited in claim 30, wherein said ascent/descent altitude trend tape is located adjacent a current aircraft altitude tape, said ascent/descent altitude trend tape including an altitude tick fixed to an end thereof which identifies said aircraft altitude above ground level.

33. The system as recited in claim 1, wherein an azimuthally direction of said velocity vector is approximately equal to an angle between a ground track of an aircraft center of mass and an aircraft centerline.

* * * * *

UNITED STATES PATENT AND TRADEMARK OFFICE
CERTIFICATE OF CORRECTION

PATENT NO. : 7,106,217 B2
APPLICATION NO. : 10/816218
DATED : September 12, 2006
INVENTOR(S) : Judge et al.

It is certified that error appears in the above-identified patent and that said Letters Patent is hereby corrected as shown below:

Claim 13, Column 8, line 55: "(using" should be --fusing--

Claim 31, Column 10, line 48: "tend" should be --trend--

Signed and Sealed this

Nineteenth Day of December, 2006

JON W. DUDAS
*Director of the United States Patent and Trademark Office*